United States Patent
Li

(10) Patent No.: US 6,626,352 B2
(45) Date of Patent: Sep. 30, 2003

(54) SOLDERING METHOD FOR SEALING ON-LINE TRANSFER DEVICE OF CABLE AND PRODUCTS MADE THEREBY

(76) Inventor: Ching-Chieh Li, No. 12-1, Lane 159, Sec. 1, Kuo Kuang Rd., Tai Li City, Taichung Hsien (TW)

( * ) Notice: Subject to any disclaimer, the term of this patent is extended or adjusted under 35 U.S.C. 154(b) by 53 days.

(21) Appl. No.: 09/757,669

(22) Filed: Jan. 11, 2001

(65) Prior Publication Data

US 2002/0088841 A1 Jul. 11, 2002

(51) Int. Cl.⁷ .......................... B23K 31/02; B21D 51/46
(52) U.S. Cl. .................. 228/245; 228/248.1; 413/21
(58) Field of Search .............. 228/124.6, 245–262; 413/7, 21; 277/316

(56) References Cited

U.S. PATENT DOCUMENTS

| | | | | |
|---|---|---|---|---|
| 3,676,744 A | * | 7/1972 | Pennypacker | 174/59 |
| 3,946,190 A | * | 3/1976 | Hascoe | 219/85.15 |
| 4,015,070 A | * | 3/1977 | Theurer | 174/51 |
| 4,119,363 A | * | 10/1978 | Camlibel et al. | 164/80 |
| 4,567,318 A | * | 1/1986 | Shu | 174/35 GC |
| 4,746,583 A | * | 5/1988 | Falanga | 174/52.4 |
| 4,750,665 A | * | 6/1988 | Falanga | 228/123.1 |
| 5,302,464 A | * | 4/1994 | Nomura et al. | 205/119 |
| 5,675,300 A | * | 10/1997 | Romerein | 333/100 |
| 5,842,626 A | * | 12/1998 | Bhansali et al. | 228/180.22 |
| 6,216,939 B1 | * | 4/2001 | Thackara | 228/124.6 |

OTHER PUBLICATIONS

US 2002/0088841 A1 Li (Jul. 11, 2002).*

* cited by examiner

*Primary Examiner*—Tom Dunn
*Assistant Examiner*—Kiley Stoner
(74) *Attorney, Agent, or Firm*—Browdy and Neimark, P.L.L.C.

(57) ABSTRACT

A soldering method is designed to seal an on-line transfer device of cable such that a housing of the device is sealed off to prevent the electromagnetic interference. The method includes a first step in which a fusing portion between a receiving seat and a cover of the housing is furnished with a soft solder. The cover is heated to cause the soft solder to melt to flow into the fusion portion, so as to fuse the receiving seat and the cover together. The housing of the device is free of the soldering marks or lumps.

11 Claims, 2 Drawing Sheets

SOLDERING METHOD FOR SEALING ON-LINE TRANSFER DEVICE OF CABLE AND PRODUCTS MADE THEREBY

FIELD OF THE INVENTION

The present invention relates generally to a cable on-line transfer device, and more particularly to a soldering method for sealing the cable on-line transfer device.

BACKGROUND OF THE INVENTION

The coaxial cable is generally used to transmit audio and video signals between a transmitter and a receiver of the cable television, video monitor, or AV system. The cable is often provided with an on-line transfer device capable of tapping, wave enhancing, or decoding. The online transfer device has a metal housing, which is externally provided with at least one input connector and one or more output connectors, and is internally provided with a circuit board and an electronic element. The metal housing is generally formed of a metal receiving seat, and a metal cover which is joined with the metal receiving seat by tin soldering, so as to prevent the signals from being affected by the electromagnetic interference, or to prevent the signals from interfering other electronic devices.

The conventional soldering method for sealing the metal housing is defective in design in that it is time-consuming, and that the tin lumps formed on the metal housing undermine the esthetic effect of the transfer device, and that the tin solder is prone to break or cut by something sharp, and further that the metal housing is often tainted by the soldering flux and is cleansed with a stain remover which contains the volatile material hazardous to human health.

SUMMARY OF THE INVENTION

The primary objective of the present invention is to provide a novel soldering method for sealing an on-line transfer device of cable. The method of the present invention is free of the deficiencies of the prior art soldering method described above.

The method of the present invention includes a first step in which a fusing area between the receiving seat and the cover of the housing is furnished with an appropriate amount of a soft solder. The cover is then heated for a short period of time such that the heat is transmitted to melt the soft solder. The molten soft solder forms an annular seam. Finally, the receiving seat and the cover are united together by soldering.

DETAILED DESCRIPTION OF THE INVENTION

Figure 1:
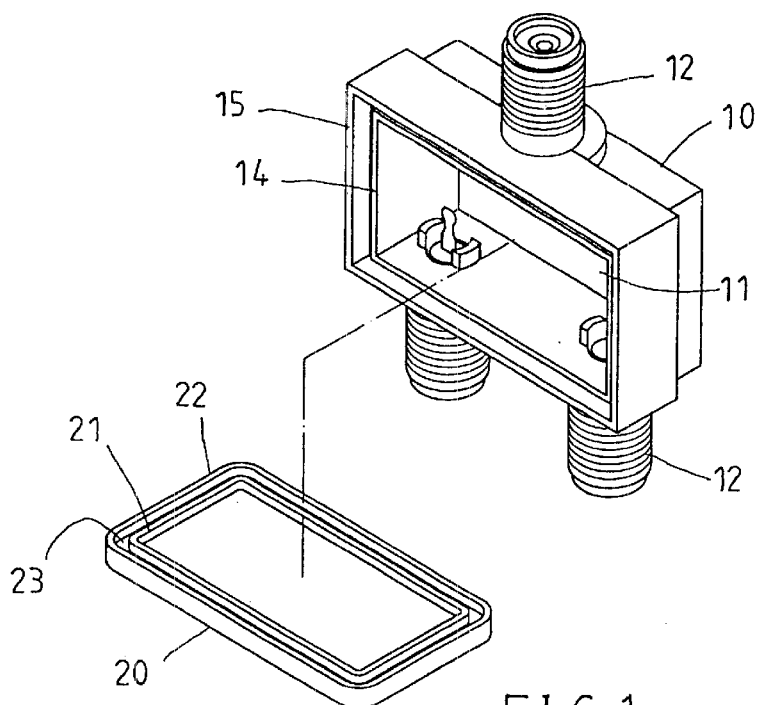
FIG. 1 show an exploded view of a transfer device housing of a first preferred embodiment of the present invention.
Figure 2:
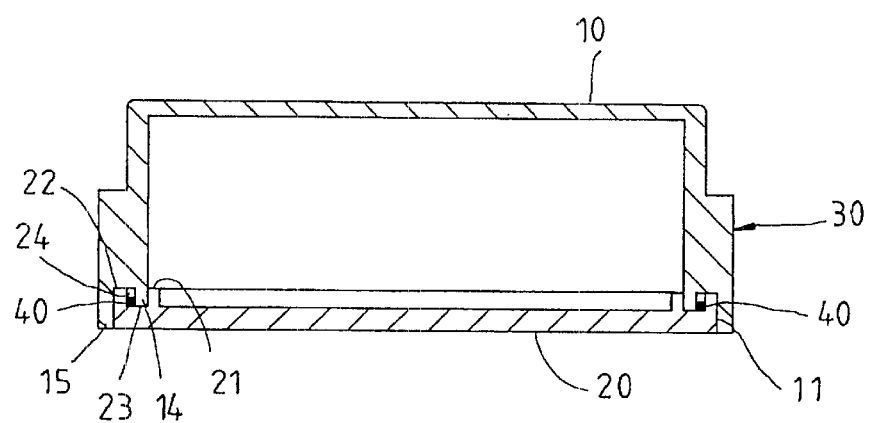
FIG. 2 show a pre-soldering schematic view of the transfer device housing of the first preferred embodiment of the present invention in combination.
Figure 3:
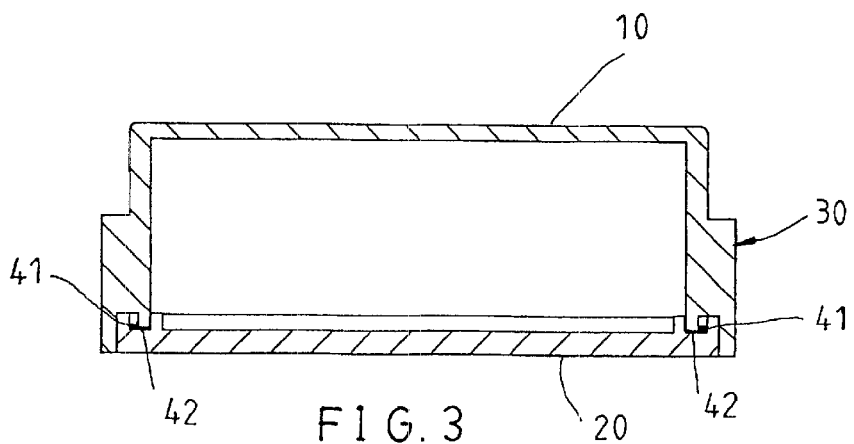
FIG. 3 shows a post-soldering schematic view of the transfer device housing of the first preferred embodiment of the present invention.

As shown in FIGS. 1–3, a transfer device housing of the first preferred embodiment of the present invention is formed of a receiving seat 10 and a cover 20 which is joined with the receiving seat 10. The receiving seat 10 is a hollow rectangular case and is provided in the bottom with a rectangular opening 11. The receiving seat 10 has a hollow interior for containing the electronic components of the transfer device. The receiving seat 10 is provided in the outer surfaces of the long sides thereof with a plurality of cable connectors 12. The receiving seat 10 is further provided in the frame edge of the bottom side thereof with an inner protruded edge 14 and an outer protruded edge 15 which is greater in length than the inner protruded edge 14. The cover 20 is shaped and dimensioned to cap the opening 11 of the receiving seat 10 and is provided in the outer edge of the inner side thereof with a rectangular inner protruded ring 21, a rectangular outer protruded ring 22, and an annular slot 23 located between the inner and the outer protruded rings 21 and 22. The cover 20 is united with the receiving seat 10 to form together a housing 30 such that the outer protruded edge 15 of the receiving seat 10 circumvents the outer edge of the cover 20, and that the inner protruded edge 14 of the receiving seat 10 is inserted into the annular slot 23 of the cover 20 to press against the inner protruded ring 21 of the cover 20, with the inner protruded edge 14 remaining a distance away from the outer protruded ring 22. As a result, there is a solder space 24 in the annular slot 23 of the cover 20.

The soldering method of the present invention involves a first step in which a soft or paste solder 40 is applied by a web fed press, i.e. serigraph, or silk-screen process on the fringe of the inside of the slot 23 such that the soft or paste solder 40 is corresponding in location to the solder space 24. The soft solder 40 contains tin and lead and has a melting point of about 200 degrees in Celsius. The cover 20 is then located in the opening 11 of the receiving seat 10, as shown in FIG. 2. With the cover 20 facing downward, the housing 30 is heated for about two seconds on a hot plate which is previously heated to have a temperature higher than 200 degrees in Celsius. As the heat is transmitted to the bottom of the housing 30, the solder ointment 40 is caused to melt rapidly. The molten solder 40 is dispersed by the capillary action into the interstices between the receiving seat 10 and the cover 20, especially between the inner protruded edge 14 and the inner protruded ring 21. The solder residue is deposited in the bottom of the solder space 24. Now referring to FIG. 3, an annular soldering strip 41 is formed in the bottom of the solder space 24 after the molten solder is cooled and solidified. In the meantime, a filling layer 42 is formed by the molten solder which is dispersed into the interstices. The receiving seat 10 and the cover 20 are thus securely joined together. In other words, the housing 30 is hermetically sealed off to minimize the effect of electromagnetic interference. It must be noted here that the heating process of the present invention is benign to the structural integrity of the electronic components which are contained in the receiving seat 10.

Figure 4:
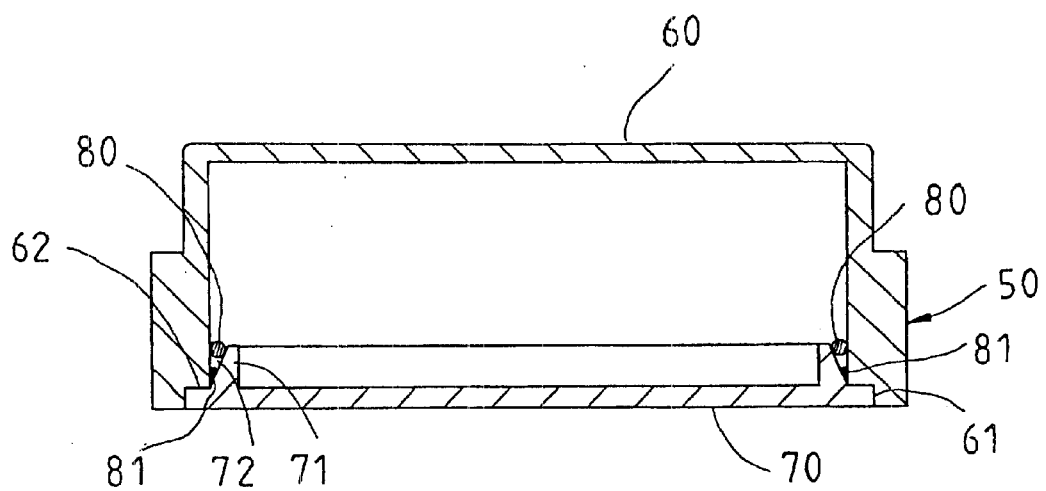
FIG. 4 shows a pre-soldering schematic view of a transfer device housing of a second preferred embodiment of the present invention in combination.
Figure 5:
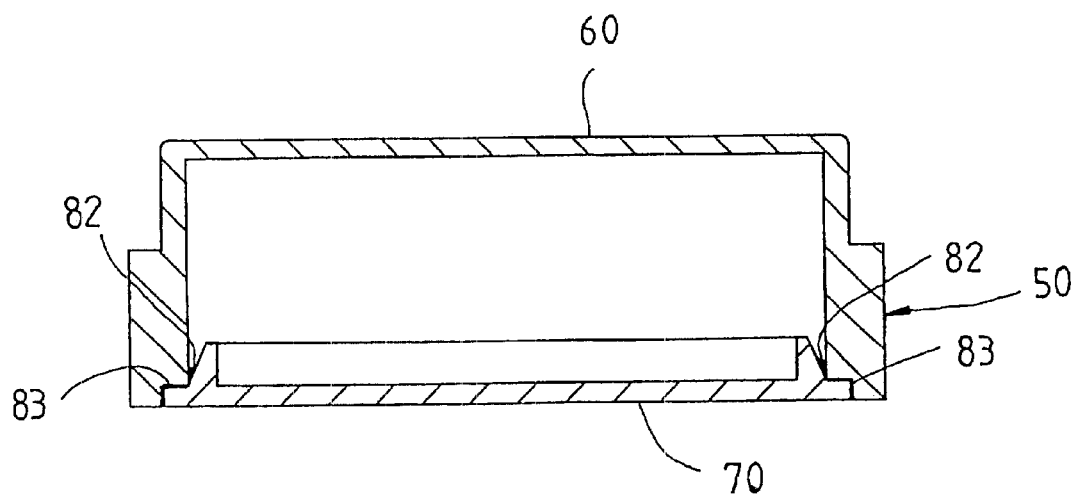
FIG. 5 shows a post-soldering schematic view of the transfer device housing of the second preferred embodiment of the present invention.

As shown in FIGS. 4 and 5, a housing 50 of the second preferred embodiment of the present invention is formed of a metal receiving seat 60 and a metal cover 70, which are electroplated with nickel. The receiving seat 60 is a hollow rectangular case with an opening 61 facing downward and is provided in the inner edge of the bottom fringe thereof with an annular shoulder 62. The cover 70 is shaped and dimensioned to join with the opening 61 such that the outer edge of the inner side of the cover 70 is in contact with the shoulder 62. The cover 70 is provided in proximity of the outer edge of the inner side thereof with a rectangular protruded ring 71, which is inserted into the receiving seat 60 and has an inclined outer side slanting inward to form with the wall of the receiving seat 60 an acute angle of 15 degrees or so. As a result, an annular acute angle space 72 is formed between the protruded ring 71 and the peripheral wall of the receiving seat 60.

The soldering method of the second preferred embodiment of the present invention includes a first step in which a solder ointment 80 is applied by the web fed press on the upper portion of the inclined side of the protruded ring 71 of the cover 70. In the meantime, a soldering flux ointment 81 is applied by the web fed press on the lower portion of the inclined side of the protruded ring 71 of the cover 70. Thereafter, the cover 70 is located in the opening 61 of the receiving seat 60. The housing 50 is then dipped into a vessel containing the molten tin for about two seconds. The dipping depth is corresponding to the thickness of the cover 70. The molten tin is kept at a temperature of 230° C. or so. As a result, the solder 80 is melted to disperse by the capillary action and the earth gravitation into the narrow end of the acute angle space 72, in which the molten solder 80 is mixed with the molten flux 81 to form a mixture. The mixture is then dispersed by the capillary action into the interstices between the receiving seat 60 and the cover 70, with the residue being deposited in the bottom end of the acute angle space 72 to form an annular soldering strip 82, as shown in FIG. 5. A filling layer 83 is formed in the interstices between the receiving set 60 and the cover 70. The housing 50 is thus hermetically sealed off. The soldering quality is enhanced by the flux 81. The receiving seat 60 and the cover 70 are electroplated with a nickel layer to promote the flowing of the molten solder. After the dipping of the housing 50 into the molten tin, the underside of the housing 50 is not tainted with tin.

The present invention is cost-effective, free of the solder taint and the solder lumps, thereby resulting in the production of the value-added product.

What is claimed is:

1. A soldering method for sealing an on-line transfer device of cable, said method comprising the steps of:

a) applying a solder on a fusing portion between a receiving seat and a cover of a housing of the on-line transfer device;

(b) locating the cover in an opening of the receiving seat;

(c) heating one side of the cover at a predetermined temperature for a predetermined period of time, so as to cause the solder to melt;

(d) allowing the molten solder to disperse into the fusion portion; and (e) cooling the molten solder deposited in the fusion portion;

wherein the cover is heated on a hot plate having a temperature in a range between 200 and 300 degrees Celsius for two seconds.

2. The method as defined in claim 1, wherein said solder contains tin and lead and takes the form of ointment.

3. The method as defined in claim 2, wherein said solder is applied on the housing by serigraphy.

4. The method as defined in claim 1, wherein the cover is heated on a hot plate having a temperature in the rang of 200 and 300 degrees in Celsius; wherein the cover is heated for two seconds.

5. The method as defined in claim 1, wherein the cover is heated by dipping the housing into a molten tin bath for two seconds.

6. The method as defined in claim 5, wherein the receiving seat and the cover of the housing are electroplated with nickel.

7. The method as defined in claim 1, wherein the receiving seat and the cover of the housing are electroplated with nickel.

8. The method as defined in claim 1, wherein the opening of the receiving seat is provided in a fringe with an inner protruded edge and an outer protruded edge; wherein the cover is provided in the fringe of an inner side thereof with an inner protruded ring, an outer protruded ring, and an annular slot located between the inner protruded ring and the outer protruded ring; wherein the solder is deposited in the annular slot; wherein the cover is located in t e opening of the receiving seat such that the inner protruded edge and the outer protruded edge of the opening of the receiving seat are in contact with the inner protrude ring and the outer protruded ring of the cover.

9. The method as defined in claim 8, wherein the cover is located in the opening of the receiving seat such that the inner protruded edge of the opening of the receiving seat is kept apart from the outer protruded ring of the cover by a distance, thereby resulting in formation of a solder space in the outer side of the annular slot of the cover; wherein the solder is deposited in the solder space.

10. The method as defined in claim 1, wherein the cover is provided in proximity of a fringe of an inner side thereof with a protruded ring having an inclined surface; wherein the cover is located in the opening of the receiving seat such that the protruded ring of the cover is inserted into the receiving seat; wherein the solder is deposited between the protruded ring of the cover and a side wall of the receiving seat.

11. The method as defined in claim 10, wherein the solder is deposited along with a soldering flux between the protruded ring of the cover and the side wall, of the receiving seat.

* * * * *